United States Patent
Noda

(10) Patent No.: US 7,555,208 B2
(45) Date of Patent: Jun. 30, 2009

(54) RECORDING/REPRODUCTION APPARATUS AND METHOD OF RECORDING/REPRODUCING AUDIO-VISUAL DATA FROM A RECORDING MEDIUM

(75) Inventor: Ryusuke Noda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/373,151

(22) Filed: Mar. 13, 2006

(65) Prior Publication Data

US 2006/0210242 A1 Sep. 21, 2006

(30) Foreign Application Priority Data

Mar. 14, 2005 (JP) ............................ P2005-070302

(51) Int. Cl.
*H04N 5/00* (2006.01)
(52) U.S. Cl. .................... 386/126; 386/46; 709/250
(58) Field of Classification Search .............. 386/69, 386/82, 83, 104, 105, 124–126, 45, 46; 369/4, 369/14; 709/231, 250
See application file for complete search history.

(56) References Cited

U.S. PATENT DOCUMENTS

| 5,790,787 | A * | 8/1998 | Scott et al. ............... 709/250 |
| 5,793,980 | A * | 8/1998 | Glaser et al. ............. 709/231 |
| 5,917,835 | A * | 6/1999 | Barrett et al. ............ 714/755 |
| 6,452,874 | B1 * | 9/2002 | Otsuka et al. ............. 369/14 |
| 6,763,400 | B2 * | 7/2004 | Numano et al. .......... 710/14 |
| 2002/0174430 | A1 * | 11/2002 | Ellis et al. ............... 725/46 |
| 2005/0008332 | A1 * | 1/2005 | Ogikubo et al. ......... 386/69 |
| 2005/0053354 | A1 * | 3/2005 | Takahashi et al. ........ 386/46 |
| 2005/0086603 | A1 * | 4/2005 | Yoshida et al. ......... 715/731 |
| 2005/0108773 | A1 * | 5/2005 | Jung et al. ............. 725/134 |
| 2006/0294562 | A1 | 12/2006 | Kikkoji et al. |
| 2007/0166010 | A1 * | 7/2007 | Van Gestel ............ 386/96 |
| 2008/0069545 | A1 * | 3/2008 | Nathan et al. .......... 386/124 |

FOREIGN PATENT DOCUMENTS

| JP | 10-243352 | 9/1998 |
| JP | 2002-218393 | 8/2002 |
| WO | WO 01/71608 | 9/2001 |
| WO | WO 2005/006613 | 1/2005 |
| WO | WO 2005/055205 | 6/2005 |

* cited by examiner

*Primary Examiner*—Thai Tran
*Assistant Examiner*—Mishawn Dunn
(74) *Attorney, Agent, or Firm*—Morgan, Lewis & Bockius LLP

(57) ABSTRACT

A recording/reproduction apparatus recording/reproducing audio-visual data from a recording medium includes; a reception unit a reception unit receiving, from a server via a network, distribution information for audio data that is not recorded an optical disk; a display unit displaying the distribution information for the audio data that is received by the reception unit; a transmission request unit transmitting an ID for the optical disk to the server via the network when an instruction is issued to download the audio data for the distribution information that is displayed by the display unit; and a downloading unit, for downloading the audio data that are transmitted, via the server, by the network, and for saving the audio data on a recording medium. The transmission request unit requests that the server transmit the audio data for the distribution information.

2 Claims, 3 Drawing Sheets

RECORDING/REPRODUCTION APPARATUS AND METHOD OF RECORDING/REPRODUCING AUDIO-VISUAL DATA FROM A RECORDING MEDIUM

CROSS-REFERENCE TO RELATED APPLICATIONS

This application is based on and claims the benefit of priority from the prior Japanese Patent Application No. 2005-070302, filed on Mar. 14, 2005; the entire contents of which are incorporated herein by reference.

FIELD OF THE INVENTION

The present invention relates to a recording/reproduction apparatus for recording audio-visual data on and reproducing video/audio data from a recording medium, and relates particularly to a recording/reproduction apparatus that can download to a recording medium, via a network, audio data that are not recorded on an optical disk, and that can reproduce the audio data.

BACKGROUND

1. Description of Related Art

Generally, video data and audio data are recorded on optical disks, such as DVDs (Digital Versatile Discs), and users who wish to view video recordings can reproduce the video data and the audio data from the optical disks. However, since individually, the storage capacity of optical disks is limited, not all audio data, such as two-channel stereo audio data, Dolby digital (trademark of Dolby Laboratories Corp., in the United States) 5.1-channel audio data, DTS (Digital Theater System) high-quality audio data, multi-language audio data and audio data for commentaries, are actually recorded. Suffice it to say, therefore, that optical disk users can not reproduce audio data that is not recorded when desired audio data are not available on an optical disk.

There is a conventional example wherein multiple sets of video information are accumulated, using time division multiplexing, or arbitrary sets of accumulated video information are output in real time, or wherein one or more sets of video information are accumulated and, at the same time, one or more arbitrary sets of accumulated video information are output (see, for example, JP-A-10-243352).

There is another conventional example wherein first MPEG data are read from a first recording medium, and based on the MPEG data, position information is obtained that indicates the positions of the preceding and succeeding data groups of a specified data group of first MPEG data, and wherein the position information is added to a position, determined for the first MPEG data, for generating second MPEG data, and the second MPEG data are recorded on a second recording medium (see, for example, JP-A-2002-218393).

SUMMARY

According to the first related art wherein a plurality of sets of video information are accumulated using time division multiplexing, or arbitrary sets of accumulated video information are output in real time, or wherein one or more sets of video information are accumulated, while at the same time, one or more arbitrary sets of accumulated video information are output in real time, a user can merely view, as desired, a program that has already been recorded, even though the above described problem is not resolved.

According to the second related art, wherein the first MPEG data are read from the first recording medium and, based on the first MPEG data, position information is obtained that indicates the positions of the preceding and succeeding data groups of the specified data group of the first MPEG data, and wherein the position information is added to the position determined for the first MPEG data for the generation of second MPEG data while the second MPEG data are recorded on the second recording medium, AV (Audio-Visual) data are recorded on a recording medium at a variable rate so as to enable special reproduction, and the above described problem can not be resolved.

The present invention has been made in view of the above circumstances and provides a recording/reproduction apparatus.

According to an aspect of the present invention, a recording/reproduction apparatus recording/reproducing audio-visual data from a recording medium comprises; a reception unit a reception unit receiving, from a server via a network, distribution information for audio data that is not recorded an optical disk; a display unit displaying the distribution information for the audio data that is received by the reception unit; a transmission request unit transmitting an ID for the optical disk to the server via the network when an instruction is issued to download the audio data for the distribution information that is displayed by the display unit; and a downloading unit, for downloading the audio data that are transmitted, via the server, by the network, and for saving the audio data on a recording medium. The transmission request unit requests that the server transmit the audio data for the distribution information.

BRIEF DESCRIPTION OF THE DRAWINGS

These and other objects and advantages of this invention will become more fully apparent from the following detailed description taken with the accompanying drawings in which.

DESCRIPTION OF THE EMBODIMENTS

Figure 1:
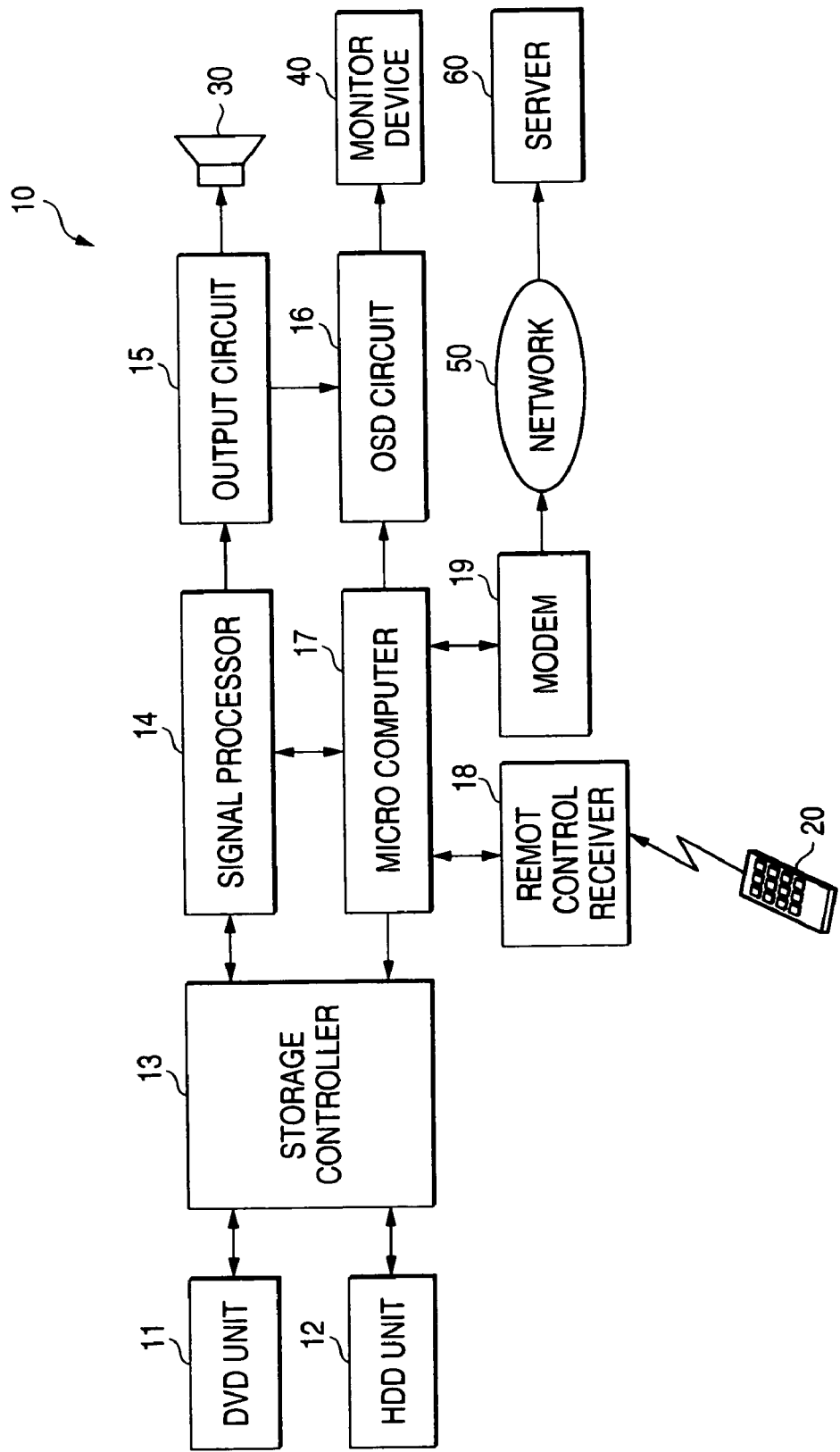
FIG. 1 is a block diagram showing the configuration of a recording/reproduction apparatus according to an embodiment.
Figure 2:
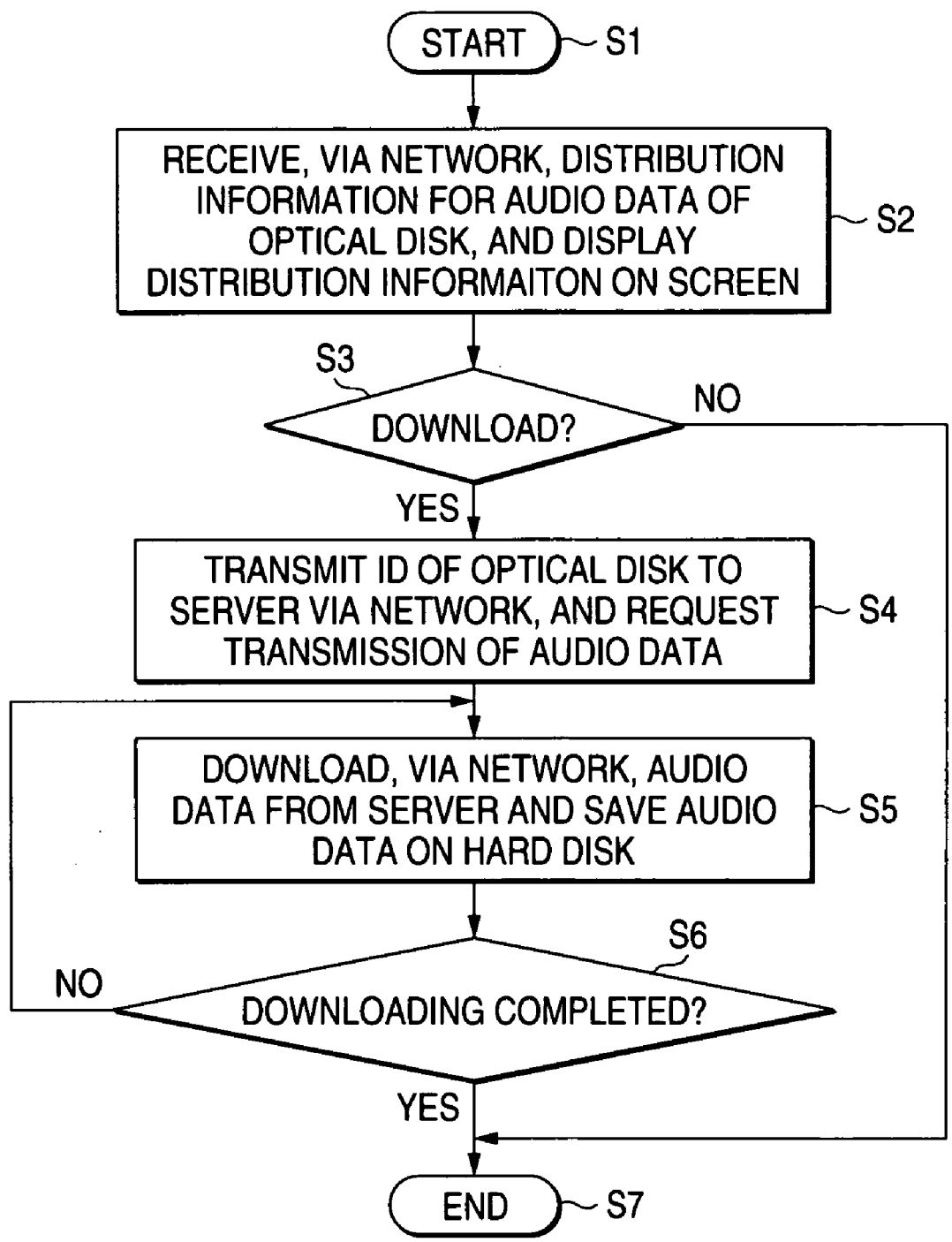
FIG. 2 is a flowchart showing the operation of the recording/reproduction apparatus according to the embodiment.
Figure 3:
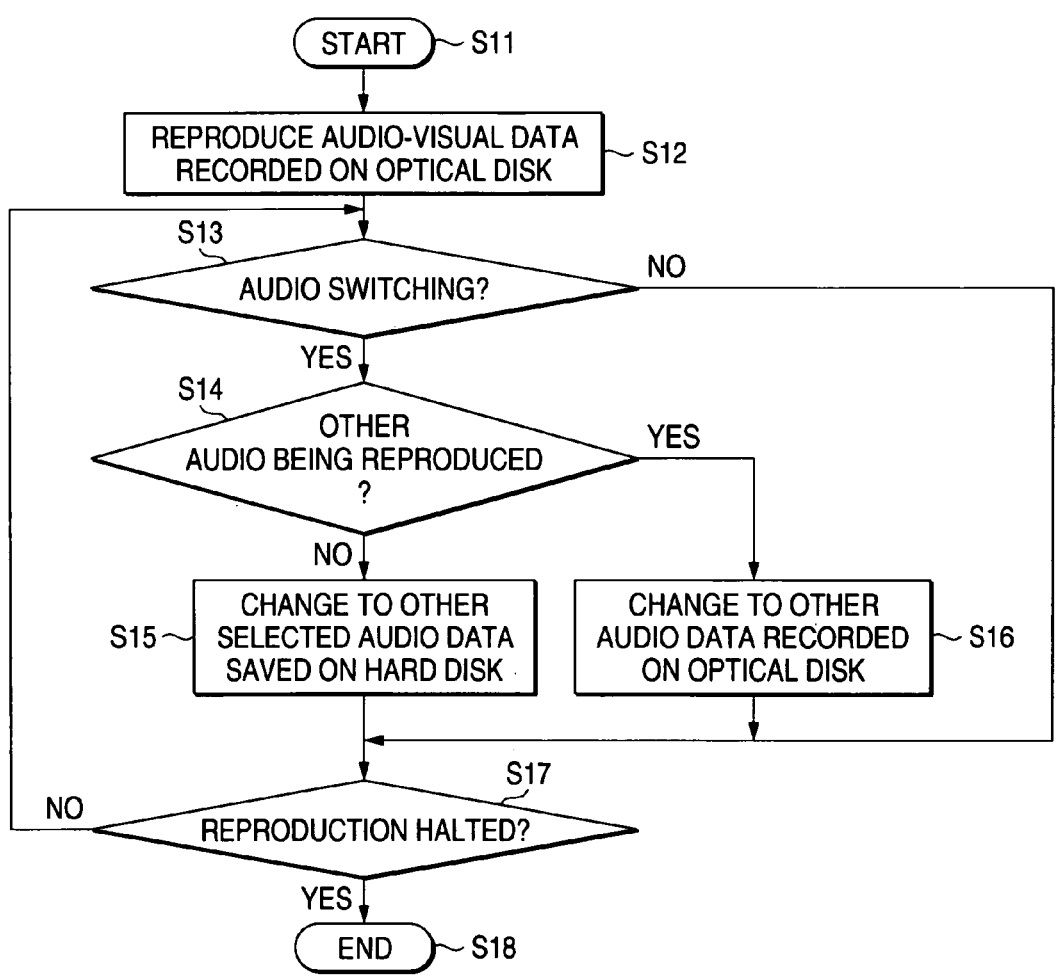
FIG. 3 is a flowchart showing the operation of the recording/reproduction apparatus according to the embodiment.

The embodiment will be described in detail while referring to the accompanying drawings. FIG. 1 is a block diagram showing the configuration of a recording/reproduction apparatus according to the embodiment, and FIG. 2 and FIG. 3 are flowcharts for the operation of the recording/reproduction apparatus according to the embodiment.

First, an explanation will be given while referring to the block diagram of FIG. 1 showing the configuration of the recording/reproduction apparatus of this embodiment. A recording/reproduction apparatus 10 comprises: a DVD unit 11, for recording audio-visual data on, or reproducing audio-visual data from, an optical disk; an HDD unit 12, for recording audio-visual data on, and reproducing audio-visual data from, a hard disk; a storage controller 13, for controlling the recording and reproduction of audio-visual data performed by the HDD unit 12 and the DVD unit 11; a signal processor 14, for performing signal processing, such as the compression, expansion, multiplexing and encoding of audio-visual data; an output circuit 15, for amplifying audio-visual data and for outputting audio data to a loudspeaker 30; an OSD (On-Screen Character Display) circuit 16, for superimposing character information with video data and for displaying character information on the screen of a monitor device 40; a micro computer 17, for controlling the entire system of the recording/reproduction apparatus 10; a remote control receiver 18, for receiving an infrared remote control signal from a remote controller 20 and for converting the infrared remote control signal into a predetermined electric signal; and a modem 19 that is connected, via a network 50, to a server 60.

The operation of the recording/reproduction apparatus 10 having this configuration will now be described.

When an operation key on the remote controller 20 is manipulated and an instruction is issued requesting the distribution of information for audio data that are not recorded on an optical disk loaded into the DVD unit 11, the micro computer 17 receives from the server 60, via the network 50, the distribution of audio data that are not recorded on the optical disk loaded into the DVD unit 11. Then, the micro computer 17 transmits a character information signal and a control signal to the OSD circuit 16, which displays, on the screen of the monitor device 40, distribution information for audio data that is received via the network 50 (not shown). Then, when an operation key for the remote controller 20 is manipulated and an instruction is issued to download audio data for the distribution information that is displayed on the screen of the monitor device 40, the micro computer 17 transmits to the server 60, via the network 50, the ID of the optical disk loaded into the DVD unit 11, and requests that audio data be transmitted by the server 60. Thereafter, when audio data are transmitted by the server 60, via the network 50, the micro computer 17 downloads the audio data transmitted from the server 60 and stores them, on the hard disk of the HDD unit 12, with the ID of the optical disk that is loaded into the DVD unit 11.

When reproduction of the optical disk is instructed by manipulation of an operation key of the remote controller 20, the micro computer 17 transmits a control signal to the storage controller 13 and reproduction is initiated of audio-visual data recorded on the optical disk mounted in the DVD unit 11.

Then, when an audio switching instruction is issued by the further manipulation of an operation key on the remote controller 20, the micro computer 17 changes into a reproduction of audio data (hereinafter, referred to as ("first audio data") selected among audio data which as corresponding to ID of optical disk that has been currently reproduced, and which are stored on the hard disk of the HDD unit 12 to be downloaded from the server 60 via the network 50. When, during the reproduction of the first audio data stored on the hard disk of the HDD unit 12, an instruction is issued to switch the audio data reproduction to those recorded on the optical disc loaded into the DVD unit 11, the micro computer 17 transmits an control signal to the storage cntroller 13 to change into the reproduction of the audio data (hereinafter, referred to as "second audio data") recorded on the optical disk. Only when video data recorded on the optical disk mounted on the DVD unit 11 are being reproduced, the first audio data can be switched from the second audio data, so that a copyright of audio data is protected.

The operation of the recording/reproduction apparatus 10 of this embodiment will now be described while referring to the flowchart in FIG. 2.

When, through the manipulation of the operation key of the remote controller 20, an instruction is issued requesting the distribution of information for audio data that are not recorded on an optical disk mounted on the DVD unit 11, program control advances from step S1 to step S2. At step S2, the distribution information for audio data that are not recorded on the optical disk loaded in the DVD unit 11 are received from the server 60 via the network 50, and the received audio data are displayed on the screen of the monitor device 40. Thereafter, program control advances to step S3.

At step S3, a check is performed to determine whether an instruction has been issued, through the manipulation of an operation key of the remote controller 20, for the downloading of audio data for distribution information that are to be displayed on the screen of the monitor device 40. When an instruction has been issued for the downloading of audio data for the distribution information to be displayed on the screen of the monitor device 40, program control advances to step S4. When, however, an instruction has not been issued to download the audio data for the distribution information to be displayed on the screen of the monitor device 40, program control is shifted to step S7 and the operation is terminated.

At step S4, the ID of the optical disk that is mounted on the DVD unit 11 is transmitted to the server 60, via the network 50, and a request for transmission of the audio data is transmitted to the server 60. Program control thereafter advances to step S5.

At step S5, audio data transmitted from the server 60 via the network 50 are downloaded, and the audio data as "the second audio data" is stored on the hard disk of the HDD uit 12 together with the ID of the optical disk. Program control then advance to step S6.

At step S6, a check is performed to determine whether the downloading of audio data to the hard disk has been completed. Then, when the downloading of audio data to the hard disk has been completed, program control advances to step S7, and the processing is terminated. However, when the downloading of audio data to the hard disk has not yet been completed, program control returns to step S5 and the processes beginning at step S5 are repeated.

The operation of the recording/reproduction apparatus will now be described while referring to the flowchart in FIG. 3.

When an instruction for the reproduction of an optical disk is issued through the manipulation of an operation key of the remote controller 20, program control advances from step S11 to step S12. At step S12, audio-visual data recorded on an optical disk mounted in the DVD unit 11 are reproduced, and program control advances to step S13.

At step S13, a check is performed to determine whether an audio switching instruction has been issued by the manipulation of the operation key of the remote controller 20 to change the audio data that are to be reproduced. When an audio switching instruction is issued, program control advances to step S14. And when an audio switching instruction has not been issued, program control is shifted to step S17.

At step S14 whether or not "the first audio data" stored on the hard disk of the HDD unit 12 is currently being reproduced is determined. When "the first audio data" is currently being reproduced, program control is shifted to step S16. Then, when "the first audio data" is not currently being reproduced, program control advance to step S15.

At step S15, audio data to be reproduced are changed to those data that are consonant with the ID of the currently reproduced optical disk and that are selected from other audio data that were downloaded from the server 60, via the network 50, and are stored on the hard disk of the HDD unit 12. Program control thereafter advances to step S17.

At step S16, the reproduction of audio data is changed to the reproduction of audio data recorded on the optical disk mounted to the DVD unit 11. Program control is thereafter shifted to step S17.

At step S17, a check is performed to determine whether a halt instruction, for the reproduction of an optical disk, has been issued through the manipulation of an operation key of the remote controller 20. When an optical disk reproduction halt instruction has been issued, program control advances to step S18 and reproduction is halted. When an optical disk reproduction halt instruction has not been issued, program control returns to step S13 and the processes beginning at step S13 are repeated.

The embodiment has been described in detail. However, the present invention is not limited to this embodiment, and can, of course, be variously modified or improved within the scope of the technical knowledge of one having ordinary skill in the art.

According to the embodiment, distribution information for audio data that are not recorded on an optical disk is received from a server via a network, and the distribution information received for audio data is displayed. And when the downloading of audio data for the displayed distributed information is instructed, the ID of the optical disk is transmitted to the server via the network to request that the server permit the transmission of audio data corresponding to the distribution information. Then, audio data transmitted by the server via the network are downloaded and saved on a hard disk, as well at the ID of the optical disk. Thus, when an instruction is issued for the switching of audio reproduction for audiovisual data that are recorded on a currently reproduced optical disk, audio data to be reproduced are exchanged for different audio data that are selected from among audio data, for the currently reproduced optical disk, that are saved on the hard disk. Therefore, for the reproduction of an optical disk, audio data that are downloaded via a network and that are not recorded on an optical disk can be reproduced, and video data images recorded on the optical disk can be viewed. Further, since an ID for the optical disk is transmitted when the audio data are downloaded, copyrighted audio data that are distributed via the network can be protected.

According to the embodiment, distribution information for audio data that are not recorded on an optical disk is received from a server via a network, and the distribution information received for audio data is displayed. Thus, when the downloading of audio data for the displayed distributed information is instructed, the ID of the optical disk is transmitted to the server, via the network, to request that the server transmit audio data corresponding to the distribution information. Then, audio data transmitted by the server, via the network, are downloaded and saved on a hard disk. Hence, for the reproduction of optical disk contents, audio data that are downloaded via the network and that are not recorded on the optical disk can be reproduced, and images of video data recorded on the optical disk can be viewed. Further, since an ID for the optical disk is transmitted when the audio data are downloaded, the copyright for audio data distributed via the network can be protected.

According to the embodiment, since downloaded audio data are stored on a hard disk with the ID of an optical disk, the downloaded audio data can be saved on the hard disk in correlation with an optical disk.

According to the embodiment, when an audio reproduction switching instruction is issued for an optical disk on which are recorded audio-visual data that are currently being reproduced, and the audio data to be reproduced are changed to other audio data selected from among those, on the optical disk currently being reproduced, that are stored on the hard disk. Thus, the reproduction of audio data for an optical disk that currently is not being reproduced is prevented, and the copyright for downloaded audio data can be protected.

What is claimed is:

1. A recording/reproduction apparatus having a hard disk and operable to reproduce visual data and first audio data which is related to the visual data, which are recorded on a recording medium, the recording/reproduction apparatus comprising:
   a reception unit operable to receive, from a server via a network, distribution information of second audio data which is different from the first audio data and is related to the visual data recorded on the recording medium;
   a display unit operable to display the received distribution information;
   a transmission request unit operable to transmit an ID of the recording medium to the server via the network, and operable to request the server to transmit the second audio data;
   a downloading unit operable to download the second audio data which is transmitted from the server via the network, and operable to save the download second audio data on the hard disk, together with the ID of the recording medium;
   a reproduction unit operable to simultaneously reproduce the visual data and the first audio data or the saved second audio data; and
   a reproduction switching unit operable to switch between the first audio data and the second audio data which the reproduction unit reproduces.

2. A The recording/reproduction apparatus having a hard disk and operable to reproduce visual data and first audio data which is related to the visual data, which are recorded on a recording medium, the recording/reproduction apparatus comprising:
   a reception unit operable to receive, from a server via a network, distribution information of second audio data which is different from the first audio data and is related to the visual data recorded on the recording medium;
   a display unit operable to display the received distribution information;
   a transmission request unit operable to transmit an ID of the recording medium to the server via the network and operable to request the server to transmit the second audio data;
   a downloading unit operable to download the second audio data which is transmitted from the server via the network, and operable to save the download second audio data on a the recording medium;
   a reproduction unit operable to simultaneously reproduce the visual data and the first audio data or the saved second audio data; and
   a reproduction switching unit operable to switch between the first audio data and the saved second audio data which the reproduction unit reproduces.

* * * * *